Figure 2:
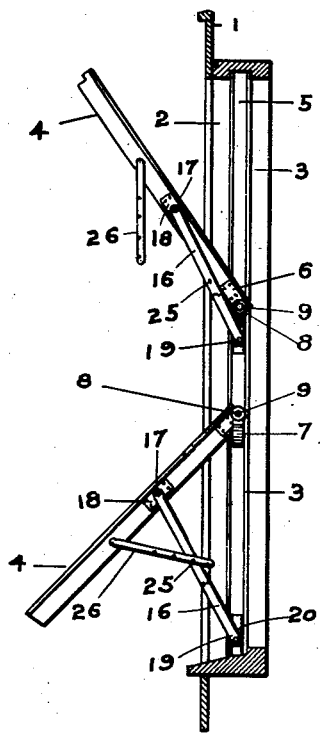

A. C. SOULE & L. A. LARSEN.
WINDOW.
APPLICATION FILED OCT. 31, 1911.

1,159,604.

Patented Nov. 9, 1915.
3 SHEETS—SHEET 1.

WITNESSES
M. S. Level
B. C. Chester.

INVENTORS
A. C. SOULE
L. A. LARSEN
per A. S. Paré
ATTORNEY

A. C. SOULE & L. A. LARSEN.
WINDOW.
APPLICATION FILED OCT. 31, 1911.
1,159,604.
Patented Nov. 9, 1915.
3 SHEETS—SHEET 2.
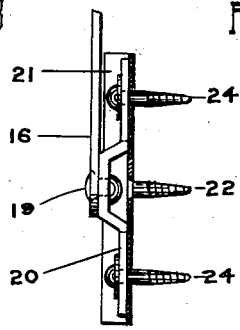
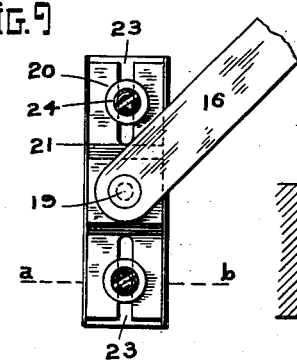
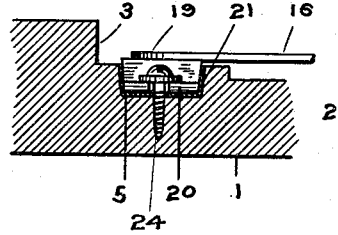
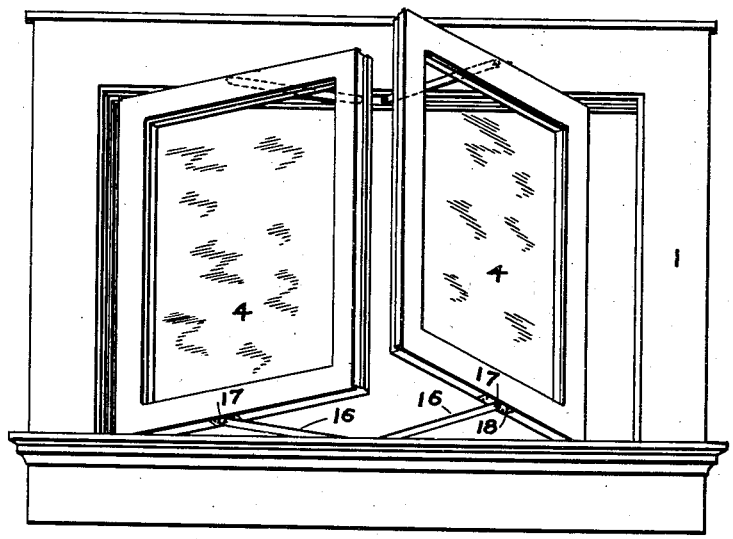
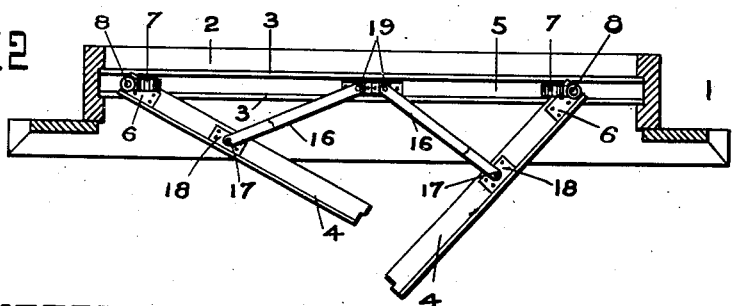
WITNESSES
M. S. Leve
B. C. Chester.
INVENTORS
A. C. SOULE
L. A. LARSEN
per A. S. Paré
ATTORNEY A. C. SOULE & L. A. LARSEN.
WINDOW.
APPLICATION FILED OCT. 31, 1911.
1,159,604.
Patented Nov. 9, 1915.
3 SHEETS—SHEET 3.
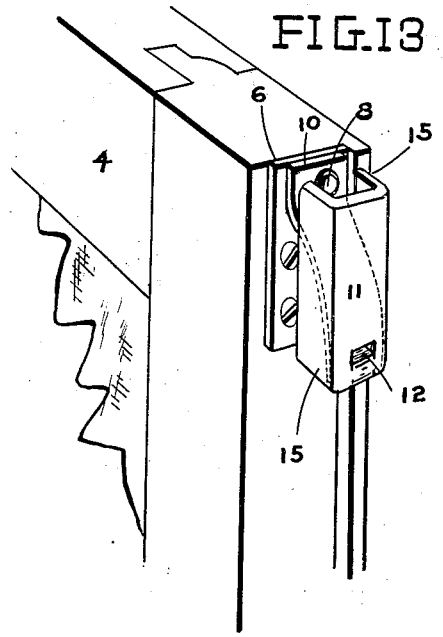
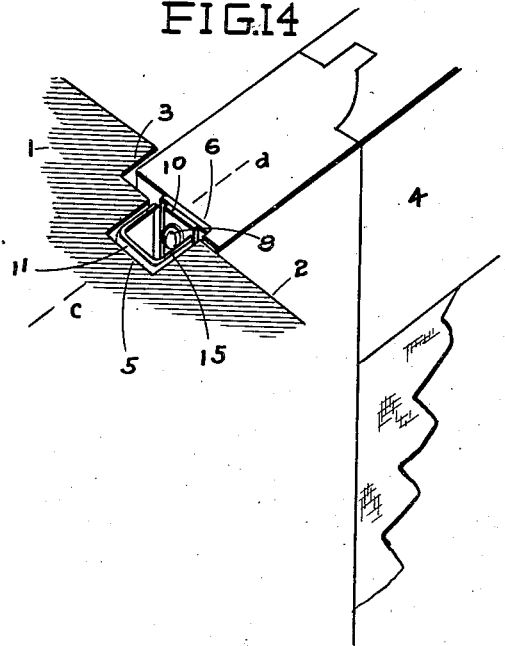
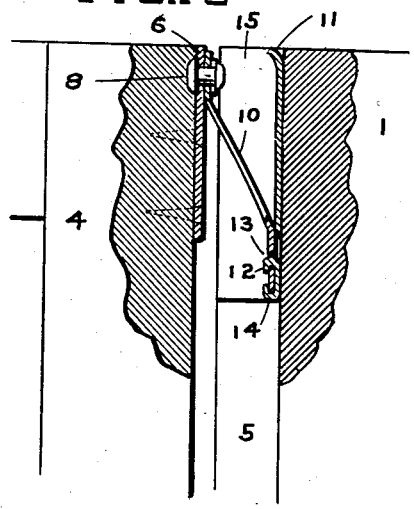
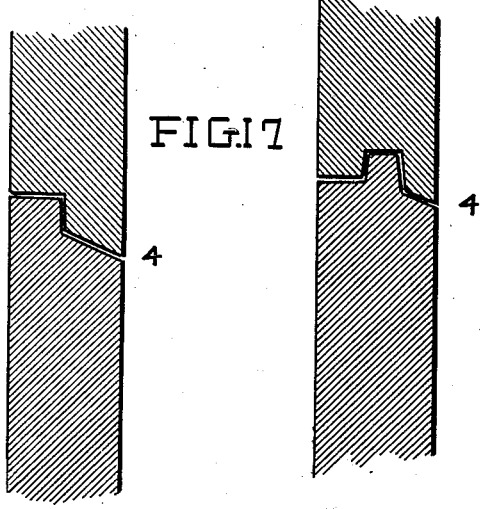
WITNESSES
INVENTORS
A. C. SOULE
L. A. LARSEN
per A. S. Paré
ATTORNEY

UNITED STATES PATENT OFFICE.

ARTHUR C. SOULE AND LOUIS A. LARSEN, OF SAN FRANCISCO, CALIFORNIA, ASSIGNORS, BY MESNE ASSIGNMENTS, TO THE SIMPLEX WINDOW COMPANY, OF SAN FRANCISCO, CALIFORNIA, A CORPORATION OF CALIFORNIA.

WINDOW.

1,159,604.        Specification of Letters Patent.        Patented Nov. 9, 1915.

Application filed October 31, 1911. Serial No. 657,784.

*To all whom it may concern:*

Be it known that we, ARTHUR C. SOULE and LOUIS A. LARSEN, citizens of the United States, residing in the city and county of San Francisco, State of California, have invented certain new and useful Improvements in Windows, whereof the following is a specification.

Our invention relates in general way to windows, and especially to swinging windows which move entirely to one side or the other of a supporting frame as opposed to centrally pivoted windows, which, when opened, lie with their sashes on both sides of the frame.

Centrally pivoted windows have the upper and lower parts of their sashes acting as counterweights to each other, and are practically balanced in any position; but windows which swing from one of their edges are counterweighted; or fixed in position by adjusting means or devices which require to be moved and operated by hand or otherwise and through which the sashes are moved.

It is also characteristic of windows hinged on their edges that only one face is turned inwardly, which makes washing of the outside thereof a difficult matter. Furthermore vertically sliding windows hung usually by counterweights move in one direction and thereby open one-half of the space in which they operate.

It is our object to provide a novel window in which the sash swings entirely to one side of the frame, and which requires no counterweights or mechanism to give it stability in any position desired, and in which the sash may be turned with either face inward or outward.

A further object of our invention is to provide simple and effective means for hanging, operating and controlling the movements of the sashes and to increase the opening space in operation.

With these and other objects in view, the nature of which will appear in the following specification, our invention consists in a grooved window-frame, in which friction guides are slidably secured and support the sash in pivoted position near its upper ends, and carrier arms, one end of which is pivotally secured to the side of said sash, near its vertical center, while the other end is pivoted to the side of the window frame.

The invention further consists in providing window frames with a sill and jambs designed to receive a sash and form therewith a water tight joint by providing the jambs with a rabbet and the side walls of the rabbet provide a stop for the sash when the same is in a closed position.

Figure 1:
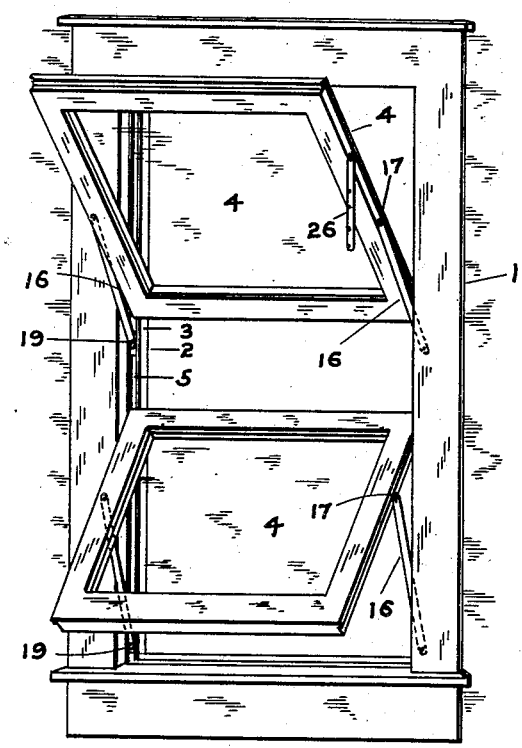
Figure 3:
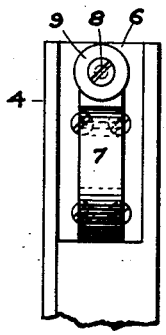
Figure 4:
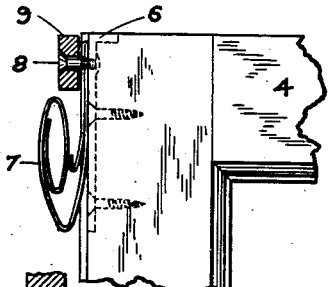
Figure 5:
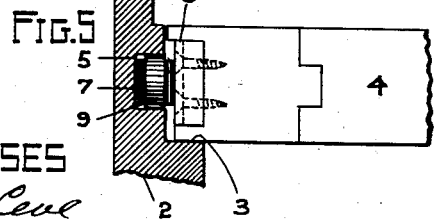
Figures 6, 7:
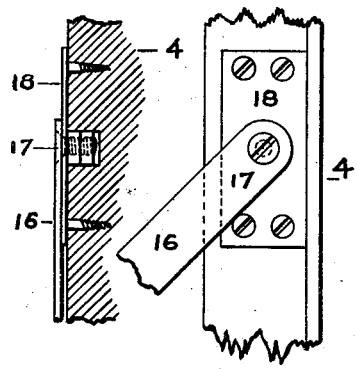

It also further consists in the novel combinations, parts and arrangements, explained in the following description, and particularly pointed out in the claims at the end hereof, and illustrated in the accompanying three sheets of drawings, in which, Figure 1, is a perspective view of a window-frame and the sashes therein in open position, looking from the outer side thereof, constructed and arranged in accordance with our invention. Fig. 2, is a side elevation of Fig. 1, the window-frame being in cross section. Fig. 3, is a front elevation of one form of our friction-guides as applied to the upper edge of a sash by which the same is supported in pivoted position in the window-frame. Fig. 4, is a side elevation of Fig. 3. Fig. 5, is a plan view of Fig. 4 showing the window-frame in cross section. Fig. 6, is a side elevation of a portion of our pivoted carrier arm, at the point connected to the sash which is shown in vertical section. Fig. 7, is a front elevation of the parts shown in Fig. 6. Fig. 8, is a side elevation of a detached portion of our pivoted carrier-arm and its adjacent parts at the point connected to the window-frame. Fig. 9, is a front elevation of the parts shown in Fig. 8. Fig. 10, is a cross sectional view of Fig. 9, taken on dotted line $a$, $b$, showing also a broken portion of the window-frame. Fig. 11, is a perspective view of our window, looking from the outer side thereof and showing the sashes disposed to swing horizontally. Fig. 12, is a plan view of our window-frame, horizontally disposed, with the top thereof cut away and the sashes therein in open position. Fig. 13, is a perspective view of the upper outer edge corner of a sash showing a modified form of the friction-guide and spring connection pivoted to the stile thereof. Fig. 14, is a perspective view of the parts shown in Fig. 13 also showing a broken cross section of the window-frame. Fig. 15, is a vertical elevation taken from line $c$, $d$ of Fig. 14, showing the arrangement and connection of the friction-guides and their adjacent parts. Fig. 16, is a cross sectional view showing the meeting longitudinal edges of an upper and lower sash formed into a lapping joint and, Fig. 17, is a similar view showing the meeting edges formed into a tongue and groove joint.

The same symbol of reference marks the same part in whichever view it may appear.

Referring to the drawings, the frame 1 is provided with side jambs 2 having the rabbet 3 formed therein, the side wall surrounding said rabbet 3 adapted to form a suitable seat and weather strip for the sash when the same is in a closed position.

Within the side jambs is groove 5 which may be lined with metallic strips or casing (not shown) to improve the wearing efficiency and adapted to receive therein a slidable friction guide by which the sash 4 is pivotally supported within the window-frame in any position desired.

The friction-guide just mentioned is shown in detail in Figs. 3, 4, and 5 and in modified form in Figs. 13, 14, and 15. In the first form it comprises a plate 6 which may be secured to the outer upper edges of the sash by means of screws or other suitable method of fastening and to said plate is pivotally secured a spring 7, of an elliptic shape adapted to slide in the grooves 5 and support therein the sash in whatever position the same may be adjusted by the spring pressure between the plates 6 and the frame.

At the pivot point 8 of the spring 7 is an anti-friction wheel 9 which also enters and slides in the groove 5 and acts together with the spring 7 to slidably secure the sash in position within its casing. These features are shown in Figs. 3, 4, and 5.

Referring now to the modified form of the friction-guide shown in Figs. 13, 14 and 15, the plate 6 is secured to the sash in the manner above described, and the spring 10 therein shown is pivotally secured at one end to said plate as at 8, while its other end is rigidly fastened to a bearing plate 11 by means of tongue 12 punched out therefrom and passing through a hole 13 in the spring and bent over the edge thereof and the downward projecting end 14 of the bearing plate 11 is bent over the end of the spring thus locking the same rigidly in position as shown in Fig. 15. The bearing plate just mentioned is provided with side flanges 15 slidably adjusted in the grooves 5 so that pressure from the spring 10 is exerted between plate 6 and the bearing plate 11 for every possible position of the sash and the ends of the flanges 15 together with the ends of bearing plate 11 are slightly bent inwardly to facilitate the sliding movements in the grooves.

The sash is rabbeted along the outer vertical face of its stiles to receive and partially inclose the friction-guide and the carrier-arm 16 which lies between the jambs and the sash when the window is closed. The carrier-arm just mentioned is pivotally secured at one of its ends as at 17 to a wearing plate 18 which is secured to the rabbeted portion of the stiles close to the vertical center thereof as shown in Figs. 1, 2, 11, and 12 and more particularly Figs. 6 and 7. This method of pivoting and securing that portion of the carrier-arm to the sash, constitutes an efficient fastening means and at the same time the other end of the carrier-arm 16 is pivoted in the groove 5, of the side jambs 2 as at 19 by means of plate 20 adjustably mounted in casing 21 which is adapted to fit in the groove 5 and is secured therein by means of the screw 22 as shown particularly in Figs. 8, 9, and 10.

The ends of plate 20 are provided with slots 23 to permit such adjustment in the casing 21 as may be necessary while setting up the sash permanently in position and which is accomplished by means of screws 24 engaging the slots 23 and passing through the bottom part of the casings and screwed to the window-frame thus securing the plates in position.

The middle portion of the plate 20 forms the pivot point 19 of carrier-arm 16 which is raised above the edges of the groove 5 so that the carrier-arm can move freely while opening or closing the sash.

When the window is open as shown in Figs. 1 and 2, the portion of the sash between the points 17 and 8, the portion of the frame, between the points 8 and 19 and the carrier-arm 16 form a triangle in which the lengths of two of the sides, to wit, the side 17—19 and the side 17—8, are fixed and in which the point 17 forms the vertex and point 19 is fixed. The point 8 by this construction always lies in the plane of the jamb. As the window opens and closes the altitude of the triangle aforesaid varies; for which reason, there being two sides of the triangle fixed in length, the third side must vary in correspondence with the change of altitude. It is part of the function of the friction-guide to vary the third side by sliding in the groove 5.

By the described construction, the sash 4 swings entirely to one side of the frame; and by the frictional activity of the friction-guide and the supporting action of the arm 16, the sash is stably fixed in any position desired, without counterweight.

Describing now the arrangement whereby either face of the glass may be turned inwardly, the desired result is obtained by making the distance between point 17 and the point 8 shorter than the distance between the points 17 and 19, whereby the friction-guide may slide past the position in which the plane of the sash forms a right angle with the jamb, into a position where it forms an obtuse angle with the portion of the frame included between the point 8 and the point 19. Such a position is illustrated in Figs. 1 and 2 by the upper sash.

The drawings illustrate a double sashed window, the edges thereof being rabbeted; and the jointing edges of the two sashes are rabbeted to fit each other or form into lap-joint as shown in Fig. 16 or tongue and groove as in Fig. 17. Of course where only one sash is used both the upper and lower sash rails are formed to fit the lintel and sill. Such construction is shown at the upper edge of the upper sash and the lower edge of the lower sash, in Fig. 2.

The closed sash may be locked by any suitable means (not shown in the drawing). In the open position two states are disclosed, one, which may be called the normal is shown by the lower sash, and the other abnormal, shown by the upper sash, and only used when it is desired to clean the outside surface of the glass. The open window may be locked in the normal position of the sash if desired by means of the pin 25 on carrier-arm 16 and the notched arm 26, pivoted to the sash as particularly shown in Fig. 2.

Referring now to Figs. 11 and 12, they are presented to show our window disposed so the sash may swing in horizontal instead of vertical arcs. The lintel and sill are provided with grooves, instead of the side jambs, as in Figs. 1 and 2; and the friction-guides slide horizontally instead of vertically. Therefore in reading the above description as applied to our horizontally disposed window, it is only necessary to change the terms jamb, lintel and sill in an obvious way, to render Figs. 11 and 12 clearly comprehensible.

Having described our invention what we claim as new and desire to secure by Letters Patent of the United States, modification within the scope of the claims being expressly reserved, is:

1. In combination with a window frame having grooves therein, a sash adapted to operate in said frame, carrier arms adapted to support the central portion of the sash, an arm connected to the sash, the said arm adapted to engage the carrier arms and lock the sash in an open position.

2. In combination with a window frame having grooves therein, a sash adapted to operate in said frame, carrier arms adapted to support the central portion of the sash, each of the arms having lugs projecting from the side thereof, an arm having notches, said arm being connected to the sash, the said notches in the arm adapted to receive the respective lugs on the carrier arms, and lock the sash in an open position.

In testimony that we claim the foregoing we have hereto set our hands in the presence of witnesses, this 26th. day of Oct. 1911.

ARTHUR C. SOULE.
LOUIS A. LARSEN.

Witnesses:
 BLANCHE CHESTER,
 K. MONTAGUE HALL.